United States Patent [19]

Hamilton

[11] Patent Number: 5,129,438
[45] Date of Patent: Jul. 14, 1992

[54] BOOM MOUNTED TYPE TREE PROCESSING HEAD AND MOUNTING THEREFORE

[75] Inventor: Douglas D. Hamilton, Mount Royal, Canada

[73] Assignee: Logging Development Corporation, Montreal, Canada

[21] Appl. No.: 616,561

[22] Filed: Nov. 21, 1990

[51] Int. Cl.$^5$ .................... B27L 1/00; A01G 23/08
[52] U.S. Cl. .................. 144/343; 144/2 Z; 144/338
[58] Field of Search ............. 144/2 Z, 3 D, 336, 337, 144/343, 338

[56] References Cited

U.S. PATENT DOCUMENTS

| | | | |
|---|---|---|---|
| 3,461,928 | 8/1969 | Siiro. | |
| 3,468,352 | 9/1969 | Larson et al. | |
| 3,498,350 | 3/1970 | Maradyn. | |
| 3,542,099 | 11/1970 | Gibson | 144/34 R |
| 3,763,905 | 10/1973 | Hamilton et al. | 144/2 Z |
| 3,910,326 | 10/1975 | Tucek | 144/34 E |
| 3,999,582 | 12/1976 | Allen et al. | 144/2 Z |
| 4,004,622 | 1/1977 | Hamilton | 144/34 E |

FOREIGN PATENT DOCUMENTS

| | | | |
|---|---|---|---|
| 1034021 | 7/1978 | Canada. | |
| 1066593 | 11/1979 | Canada | 144/2 Z |
| 1077087 | 5/1980 | Canada. | |
| 2855430 | 7/1979 | Fed. Rep. of Germany | 144/2 Z |

Primary Examiner—W. Donald Bray
Attorney, Agent, or Firm—Stanley E. Johnson

[57] ABSTRACT

A boom mountable tree processing head that incorporates a number of improvements, one of which is the ability to process more than one tree at a time. To do this, there is an accumulator type grapple arrangement and/or the trees are longitudinally offset for processing so that their diameters are essentially the same where they are gripped by the tree feed means. The accumulator grapple disclosed has two sets of grapples spaced apart from one another longitudinally along the processor with the arms of one grapple set being longer than that of the other. The grapple with the shorter arms also serves to press the tree against an improved endless conveyor type drive that propels the trees endwise for processing. Another improvement is the endless drive that includes two spaced apart driven endless chains located respectively on opposite sides of the feed path and interconnected by a plurality of somewhat resiliently flexible shoes. The processing head is hydraulically operated. There is an improved mounting that includes a rotary coupling on the processing head that has a rotor with hydraulic lines connected thereto. The rotor turns in response to pivoting of the processing head on the end of the boom. The processing head is suspended from the boom by a link having a hydraulic rotary actuator like pivot joint to damp oscillatory movement of the processing head.

11 Claims, 10 Drawing Sheets

BOOM MOUNTED TYPE TREE PROCESSING HEAD AND MOUNTING THEREFORE

FIELD OF INVENTION

This invention relates generally to tree processing apparatus and more particularly to improvements in a boom mounted type tree processing head.

The invention is particularly concerned with an improved drive for propelling a tree being processed and to a processing head for accumulating and processing multiple trees.

The invention is also particularly directed to an improved tree processing head of the foregoing features and mounted on the boom of a self-propelled carrier with such carrier being equipped to secure to itself for transportation purposes a quantity of trees which have been delimbed and topped by the processing head.

The invention is also directed to rotary mounting means on the processing head for the hydraulic lines.

The invention is also directed to improvements in suspending a work tool from a boom to restrain unwanted swinging movement of the work tool.

The invention also concerns an improved method of processing trees.

BACKGROUND OF INVENTION

Silvicultural considerations are playing an increasingly determinant role in the development of new forest harvesting techniques and machinery. This is particularly so in relation to the slow growing trees of the Boreal Forest type regions of the world.

The harvesting method most widely used in the Canadian Boreal Forest employs tracked feller-bunchers to prepare bunches of full trees; wheeled skidders equipped with wire or grapple means to gather the bunches of full trees and move them to truck roads, and delimbers located at the truck roads to remove the limbs and tops, and to pile the stems for subsequent truck transportation.

This method and apparatus for carrying out the same cause silvicultural damage in at least three ways namely (1) nutrient, seed sources, and plant shelter are removed from the cut-over area, (2) the broom configuration of the skidder's full tree loads sweeps down young growth in its path and (3) a blanket of tops and branches covers large areas of productive land along the truck roads and prevents regrowth there for many years. Added to the silvicultural damage is the direct economic damage of the cost of disposing of the road-side branch and top piles. To avoid some of these damages requires a change from the above described method to one which leaves branches and tops at the same location where the trees had grown.

The original manual methods of tree harvesting achieve the desired silvicultural ends, but economics preclude their use. Many different types of apparatus have been developed, some of which might meet the desired end result. Some of these are represented by the teachings in Maradyn's U.S. Pat. No. 3,498,350, Eynon's Canadian Patent 835,144, Larson's U.S. Pat. No. 3,468,352 and Siiro's U.S. Pat. No. 3,461,928. All of the units disclosed therein combine felling, delimbing and topping functions. Some include one or more of cross-cutting, loading and transportation functions. None have achieved wide commercial success because of unattractive economics stemming from machine complexity and the productive limitation of a one-tree-at-a-time process.

In recent years processing heads have been introduced into the tree harvesting field. These are exemplified by the type disclosed in Hamilton's Canadian Patent 1,034,021 and those known commercially as the Steyr K.P. 40 from Austria and the F.M.G. 762 from Finland. Some, like the F.M.G. 762, are designed to fell and process the trees into discrete lengths. Others, like the K.P. 40, process prefelled trees into discrete lengths. Such devices have achieved significant commercial success in Europe and are now being introduced into North America. When they are employed at the growing site of the trees that is where the branches and tops will be left. These devices will therefore contribute to a significant reduction in silvicultural damage. What remains to be determined is the optimum method for their employment and thereby the optimum number of functions they should incorporate.

SUMMARY OF THE INVENTION

An object of the present invention is to provide an improved processing head of the type that is suspended from the free end of a boom and a method for employing such processing head in forest harvesting.

Severing and accumulating means on existing feller-bunchers are very efficient and this equipment is continued to be used in the system disclosed by the applicant hereinafter. The balance of the operations (i.e. delimbing, topping, and skidding to roadside), however, according to the present method are carried out by a machine having a processing head provided with improvements which include the ability to handle two or more trees at one time.

In the preferred embodiment of the invention, the mobile tree processor includes an articulated wheel carrier of conventional design having an articulated boom of conventional design mounted thereon. The boom has a reach which is compatible with the stability characteristics of the carrier. The processing head disclosed hereinafter delimbs and if desired also tops, two or more trees at one time. The vehicle is also adapted to skid the processed trees by having mounted thereon two side-by-side cable bunks. If desired, however, the vehicle may be adapted for the skidding function according to the teachings of Hamilton et al., Canadian Patent 897,112. The mobile tree harvester of the present invention can also include, if desired, a felling/cut-off saw and computerized controls.

Another object of the present invention is to provide a novel top cutting mechanism which is a component part of the delimber, thereby minimizing capital and maintenance costs of components.

A further object of the present invention is to provide a processing head with a multiple grapple arrangement that permits the accumulation of trees in the processing head prior to delimbing. As an alternative, the multiple tree handling capability can be provided in accordance with the teachings of Canadian Patent 1,077,087.

A still further object of the present invention is to provide a processing head with a particular shoe arrangement and support which improves the efficiency of the multiple tree feeding capability and thus, reduce the power transmission losses in the feed mechanism.

A still further object of the present invention is to provide a hydraulic hose mounting arrangement which feed the processing head so as to minimize hose twisting and also minimize the length of hose required.

The processing head is suspended from a boom and applicants U.S. co-pending application allowed Sep. 12, 1990 is directed to a motion damper the subject of which is incorporated herein by reference thereto. The motion damper is in one or both of a two axis connecting link piece between the boom and the processing head. Employing applicant's arrangement for mounting the processing head facilitates more accurate positioning of the processing head for tree grappling. The processing head with the load of trees is also stabilized when being swung into position for loading.

BRIEF DESCRIPTION OF THE DRAWINGS

The invention is illustrated by way of example with reference to the accompanying drawings wherein.

DETAILED DESCRIPTION OF PREFERRED EMBODIMENTS

Figures 1, 2:
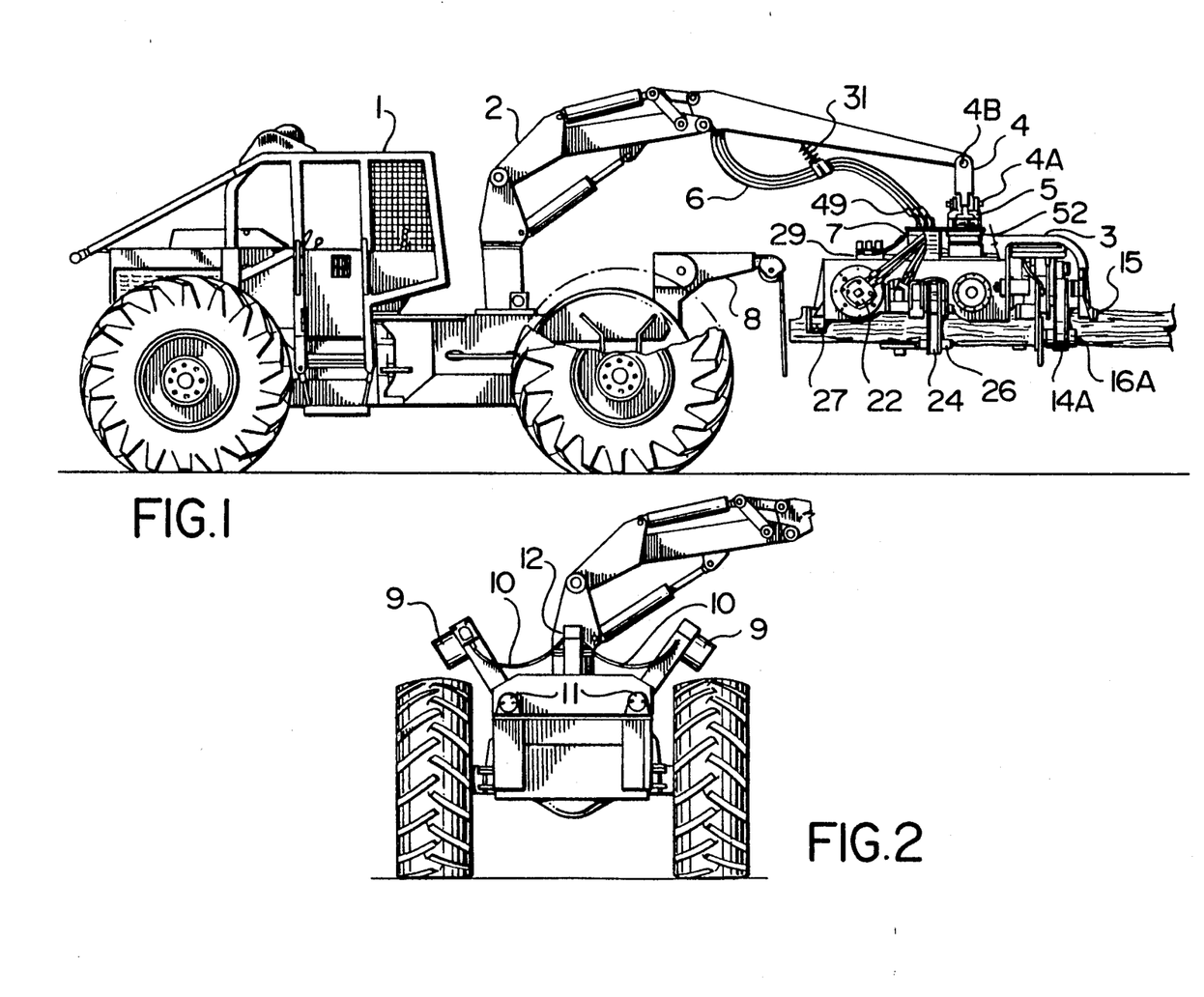
FIG. 1 is a side elevational view of a preferred embodiment of a mobile tree processor of the present invention.
FIG. 2 is a rear elevation view illustrating a double bunk tree skidder arrangement.

With reference to the drawings, FIG. 1 illustrates a conventional off-road carrier 1 of the articulated frame steer type having mounted thereon a conventional articulated and rotatable boom 2. The boom reach and lift capacity are compatible with the processing head and tree weights and the carrier stability characteristics. A processing head 3 is suspended from the free outer end of the boom by a universal joint type link mechanism 4 pin connected at each of 4a and 4b by respective ones of a pair of swing damping devices shown in detailed cross-sectional view in FIG. 11. The processing head 3 is suspended from a hydraulically powered rotator 5 that has the stator thereof connected at 4a to the universal joint 4. The processing head can be controllably rotated by the rotator 5. The processing head is powered hydraulically with fluid under pressure being supplied through a group of lines 6 which are connected to a driven rotary joint 7 on the processing head. Spring restraining means 31 connected to the boom and group of hoses controls the slack in the hoses.

The processing head 3 incorporates reversible feed means, delimbing means operable in both feed directions and topping means. Carrier 1 is fitted with a bunk 8 that grips and retains a number of tree stems for skidding. In FIG. 1, the bunk 8 illustrated is an adjustable wire sling bunk of the type disclosed in Canadian Patent 897,112. Two bunks are illustrated in FIG. 2 in side-by-side relationship which is useful in increasing the load capacity without inconvenience of the bunk height increase. In this embodiment, bunk wires 10 (2 being shown) are controlled from respective ones of a pair of power drums 9 mounted on the arms, rather than a drum in a housing as illustrated in the aforementioned Canadian Patent 897,112. The bunk arms pivot about respective ones of a pair of spaced apart axes 11 against a center fixed stop 12. The wires 10 from the respective drums 9 are connected separately to the fixed stop 12.

Figure 3:
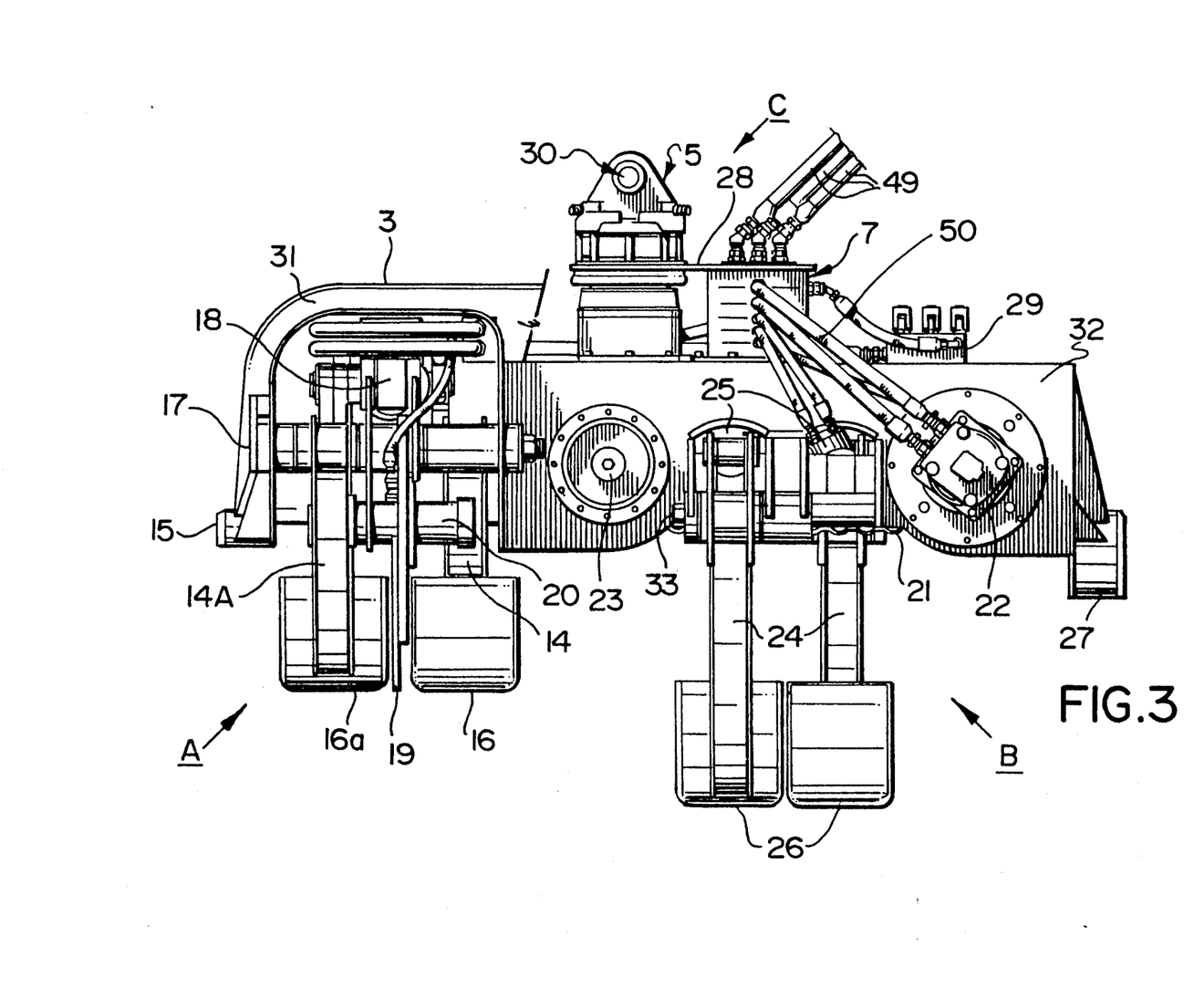
FIG. 3 is an enlarged side elevational view of the processing head of the present invention shown in FIG. 1.

FIG. 3 is a side elevational view of the processing head illustrating a first delimbing section A that includes a topping knife, a second delimbing section B which includes an endless conveyor type feed mechanism and a processing head mounting mechanism C.

The first delimbing section A comprises a curved knife 15 fixed on a frame 31 of the processing head and two arms 14 and 14a having respective delimbing plates 16 and 16a attached thereto. The arms 14 and 14a are located behind the fixed knife 15 and are pivoted about respective ones of a pair of spaced apart pivot pins 17 (see FIG. 4). Together the fixed knife 15 and the delimbing plates 16 and 16a form a triangular passage through which the trees are fed to be delimbed. The plates 16 and 16a are curved, as is apparent from FIG. 4, and each of the opposite edges are sharpened or appropriately shaped to provide a cutting edge.

The arms are powered by a hydraulic cylinder 18 which also controls movement of a topping knife 19. The topping knife 19 has a cutting blade 42 fastened to one end of an arm and which arm pivots about pivot pin 17 associated with the delimbing arm 14a. Cutting knife arm 19 (see FIG. 7) has an extension 19a extending beyond pivot pin 17 and which is connected by pin 43 to the hydraulic cylinder 18. Each of the arms 14a and top cutter arm 19 can pivot independent of one another about the pivot axis 17, but are locked together for movement in unison by a hydraulically actuated lock bolt 20. The topping knife 19 rotates with arm 14a (and delimbing knife 16a mounted thereon) and at the appropriate time (for example, at a predetermined minimum diameter of the tree) is released by actuating the lock bolt 20 to perform the topping stroke. Details of the hydraulic lock mechanism are illustrated in FIG. 7a and will be described in more detail hereinafter.

The hydraulic cylinder 18 has the cylinder portion thereof connected by a pin and trunnion 18a to an extension 17a of the delimbing arm 14.

One or more trees are fed (i.e. propelled endwise) through the processing head by a feed mechanism that consists of an endless conveyor 21 operating in conjunction with a pair of arms 24 that press the tree(s) against the spiked shoes of the endless conveyor. The endless conveyor 21 includes a pair of spaced apart endless link chains 21a driven by hydraulic motors 22 and tensioned by adjusting means 23 at the opposite end. The pair of chains 21a are interconnected by a plurality of individual shoes 58 pin connected at opposite ends as at 60 to the respective chains 21a. The shoes have grouser means or pins 59 to grip the trees.

The shoes 58 of the endless conveyor are somewhat resiliently flexible so as to accommodate some roughness and irregularities on the surface of the tree(s) and also variations in the straightness of the trees as they are propelled endwise. The shoes are preferably blocks of nylon providing not only elastic flexibility which is the referred to resilient flexibility, but also provide a low noise generating drive means as well as a base for readily detachably securing thereto traction pins 59.

Two arms 24, actuated by hydraulic cylinders 25, press the tree bowls against the feed chain 21 in order to develop traction for effective feeding. The arms 24 have secured thereto respective ones of a pair of pads 26 sharpened at their edges and act in cooperation with another delimbing knife 27 fixed to a frame 32 to provide a second delimbing section. The pads 26 are curved and sharpened at their edges. The second delimbing section is operative to delimb on reverse feed of the trees. As will be clearly evident from FIG. 4, arms 24 extend downwardly beyond arms 14 and 14a of the first delimbing section. This difference in arm lengths permits accumulating trees by using the longer arms 24 to feed trees into the bite of arms 14, 14a for grasping thereby and while being held the longer arms are open to gather an additional or additional trees.

The hydraulic cylinder 18 that controls movement of the delimber arms 14 and 14a and the cylinder 25 that controls movement of the presser arms 24 can be actuated independent of one another or inter-related in their movement or actuated simultaneously.

The economy of the processing head is greatly enhanced if more than one tree can be processed at a time. Processing more than one tree at a time improves production but when the tree is being processed at different diameters feeding problems can occur. When the diameter of the boles are substantially different at the point of contact with the feed mechanism, the larger one gets a disproportionate share of the thrust and the smaller may stall when its limbs encounter the delimbing knives. (This is a major reason why most known processing heads operate on a one-tree-at-a-time basis). By matching tree diameters of the trees and relying to some extent on flexibility in the feed mechanism (non-metallic somewhat flexible track shoes) to accommodate minor irregularities, multiple trees can be processed satisfactorily at the same time.

To achieve the foregoing, one tree is selected and grappled against the feed chain. It is then fed in either direction until its grappled diameter matches the diameter of a second adjacent tree at a convenient position for grappling. The second tree is then gathered by cycling the grappling arms as already explained.

Since the taper on trees of a given stand is generally the same, the tree bole diameters will generally match as they are fed back and forth. Where one is shorter than the other and they are to be released with their butts aligned, the shorter can be released when it is clear of one set of grapples by opening the other. The remaining tree can then be advanced until it is in alignment with the first and then released.

Figure 4:
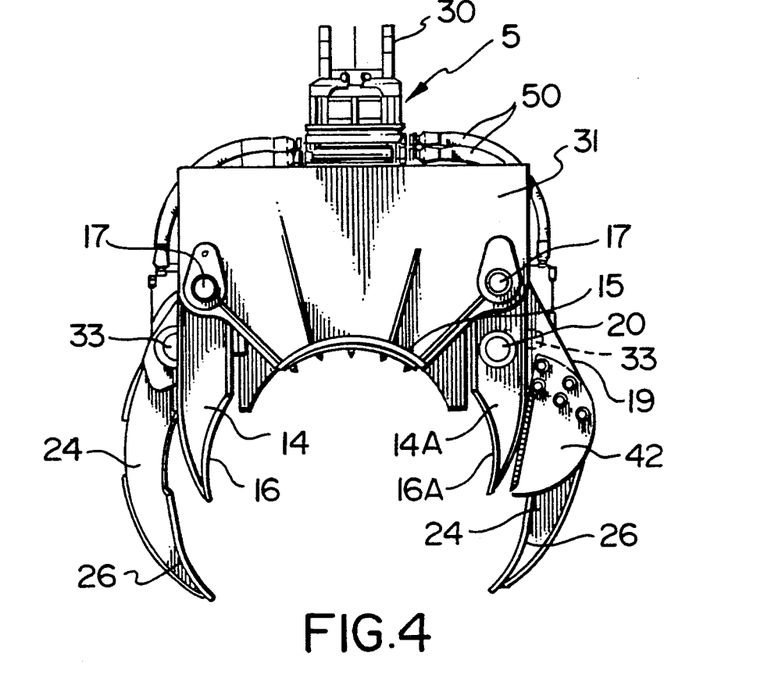
FIG. 4 is a front elevational view of the processing head.
Figure 5:
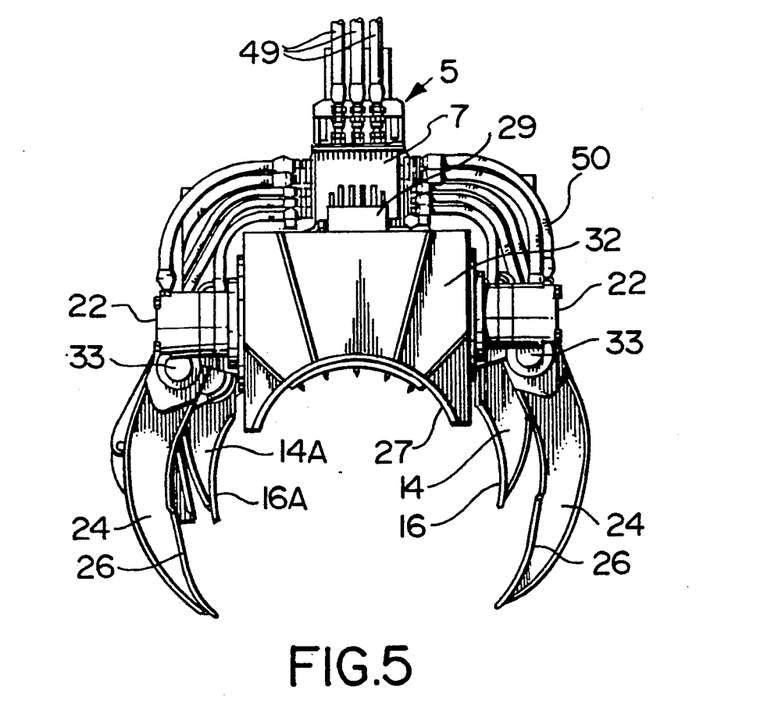
FIG. 5 is a rear elevational view of the processing head.

FIGS. 4 and 5 are respectively front and rear elevational views of the processing head and wherein the reference numeral 31 designates the housing for the first delimbing section and reference 32 designates the housing for the feed mechanism. These housings are rigidly joined together. The delimber housing 31 carries the pair of pivot pins 17 on which rotate the delimbing arms 14 and 14a. The topping arm 19 which includes the cutting blade 42 is connected to the arm 14a for a rotation therewith and selectively disconnected therefrom by the hydraulically actuated bolt 20. As previously indicated, the tree handling, grappling and stripping arms 24 are longer than the arms 14 and 14a of the first delimbing section. The curved knife 15 is shown as part of frame 31 but it maybe a separate part rigidly secured to the frame.

FIG. 5, which is a rear elevational view, shows the housing 32 which contains the feed mechanism comprising the endless conveyor 21 driven by motors 22 and supports the arms 24 by pivot pins 33. Housing 32 also contains cylinders 25 which actuate the arms 24. Rotator 5, rotary joint 7 and a control block 29 for the hydraulics are shown in tandem on top of the housing 32, such tandem arrangement best being illustrated perhaps in FIG. 3. The curved knife 27 of the secondary delimbing section is shown in FIG. 5 as a part of frame 32 but it may be a separate element and rigidly attached thereto.

Figure 7:
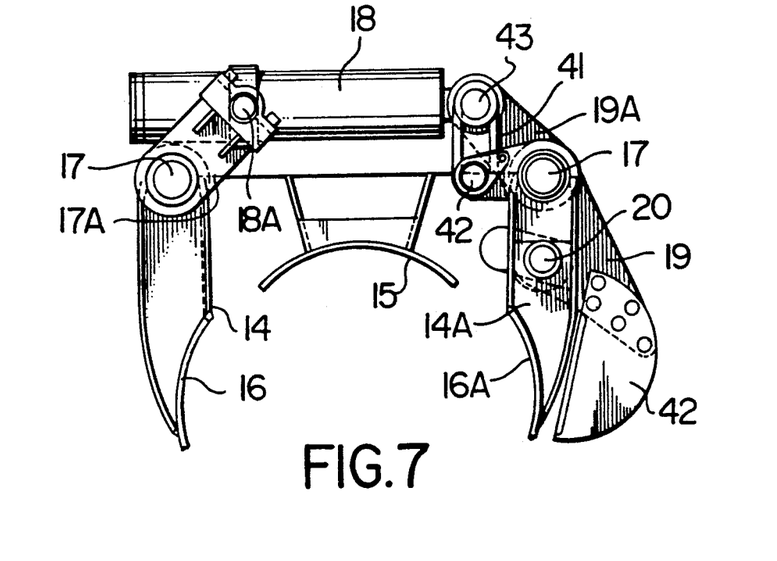
FIG. 7 is a part sectional elevational view of the main delimbing section and illustrates the arrangement of the top cutter.
Figure 7A:
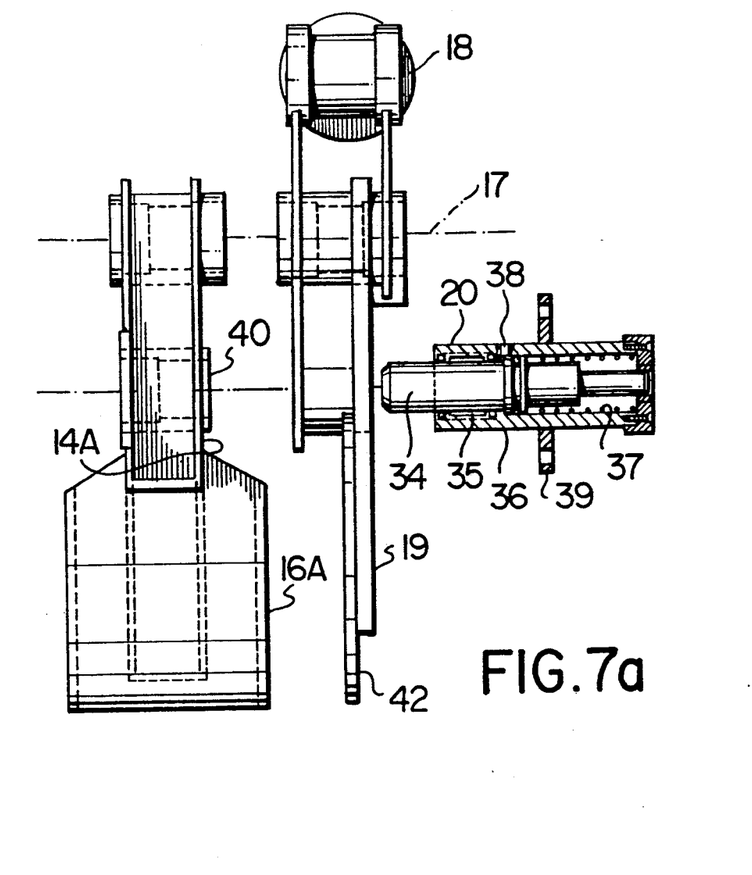
FIG. 7a is an exploded enlarged view of the delimbing-top-cutter components.

FIG. 7 is a cross-sectional view through the delimber and shows arms 14 and 14a pivoted by the respective pair of pivot pins 17 and controllably moved through actuation of cylinder 18. As the arms rotate inwardly, they form a rectangular orifice with knife 15 through which the trees are drawn to be delimbed. The inner curved portion of the arms 14 and 14a (or plates 16 and 16a secured thereto) have sharpened edges for slicing limbs off the tree as the tree(s) are propelled endwise. Cylinder 18 is directly connected to arm 19 of the topping knife by way of the arm extension 19a. As the arm 19/19a rotates, it carries with it delimbing arm 14 because of being locked together via the hydraulic locking bolt 20. When bolt 20 is withdrawn the topping assembly continues to rotate until the knife 42 attached thereto completes its cut through the trees. When the action of the cylinder 18 is reversed, an elastic mechanism 41 causes the arms 14a and 19 to realign themselves at which time the bolt 20 locks them together again. Elastic mechanism 41 (in this case a rubberband) connects crank portion 42 of arm 14a and an extension of pin 43 that connects the hydraulic cylinder 18 to the arm extension 19a of the topping knife.

FIG. 7a is an exploded enlarged side elevation of the combined delimbing arm 14a and topping assembly 19. The two are mounted on the shaft 17 whose center line in this figure is designated CL-17. They are, as previously described, fixed together for rotation by hydraulic lock bolt 20 which is fitted to the face of arm 19 by flange 39 and suitable studs or bolts not shown. Under the pressure of spring 37, the bolt 34 is extended and mates with hole 40 in arm 14a. When cylinder 18 is actuated, these assemblies rotate as one. When oil under pressure is fed to bolt 20 through hole 38, the bolt 34 has cause to retract moving on bearing 35. Arm 14a is thus free and arm 19 continues to rotate until knife 42 severs the tops. When cylinder 18 reverses, counter-rotation occurs. When the oil pressure at 38 is released, the spring mechanism 41 (see FIG. 7) causes the arms to realign and the bolt 34 resets in hole 40.

Figure 8:
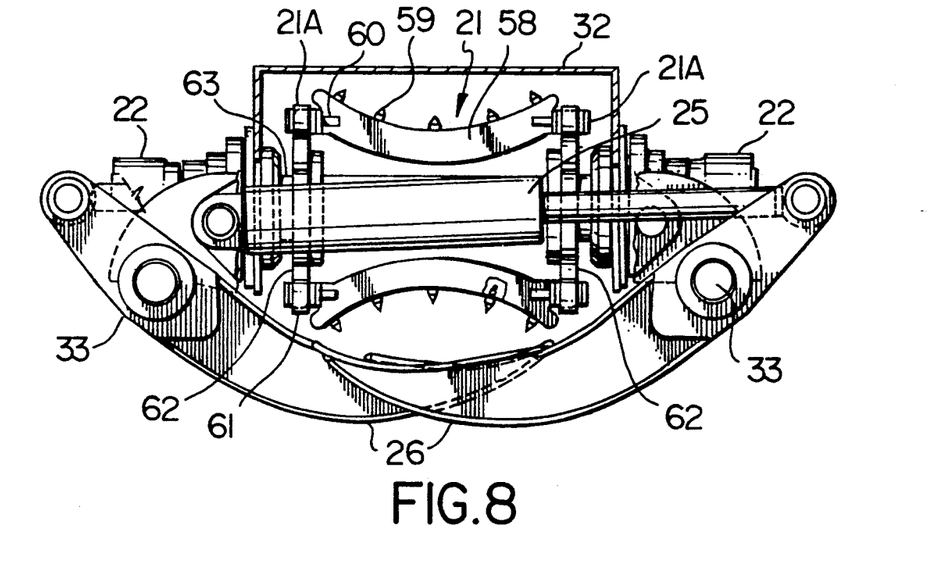
FIG. 8 is a part sectional elevational view of the tree feed arrangement illustrating the track shoe configuration and arms that force the tree against the driven track.

FIG. 8 is a sectional view of the feed arrangement. At one end of the feed conveyor 21, a shaft 63 supports two sprockets 62, such sprocket and shaft assembly being driven by the hydraulic motors 22. While two motors are shown, only one need be used. The two hydraulic motors 22 can be run in series or in parallel as may be required, depending upon the propelling force and speed required. At the opposite end of the housing is a similar arrangement of a shaft and a pair of sprockets, such assembly being an idler assembly. The two endless chains 21a connect the powered sprockets with the idler sprockets. The idler sprocket assembly is fitted with means (FIG. 3, item 23) to adjust the tension in the chains. The shoes 58 bridge the gap between the runs of the chains, each shoe 58 being fitted with a series of grousers or spikes 59 for engaging the tree surface in order to transfer thrust to it.

The shoes 58 can be made of metal or non-metallic substance or combinations thereof and as previously indicated, they are preferably elastically resilient to some extent. In the preferred form a non-metallic substance such as nylon is used which offers significant advantages. The grousers 59 can be threaded and screwed into the nylon in any number and pattern. A significant weight reduction is achieved as opposed to when steel is used and nylon shoes are less expensive to manufacture and maintain than metal shoes. Some grades of rubber will also provide an effective shoe.

The shoes 58, whether metal or non-metal, are shown attached to the chains by extended chain pins 60, as is well-known in the roller chain art. Other types of attachments are also possible.

Arms 24 are shown in FIG. 8, pivoted on shafts 33 and powered by separate hydraulic cylinders 25 (only one being shown). These arms have several functions. They act as grapples to select trees from a pile of trees. They press the tree(s) in process against the shoes 58 forcing grouser pins 59 to penetrate the tree and thus, transfer feed chain thrust to the tree. They act as delimbing knives particularly on reverse feed. The arms 24 act in conjunction with the delimber arms 14 and 14a to accumulate trees and in cases of dumping misaligned stems, they can be opened to release one while the others are retained by the delimber arms 14 and 14a.

Figure 8A:
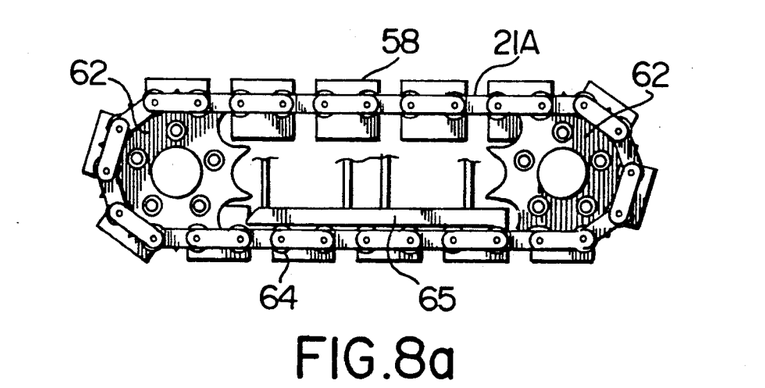
FIG. 8a is a side elevational view of the chain, sprockets, shoes, and chain support of the track type feed shown in FIG. 8.

FIG. 8a illustrates in side view the arrangement of sprockets 62, chain 21a and shoes 58. It also illustrates how the bottom run of the chain i.e. the load carrying span bears through its roller 64 against a track 65 in response to the pressure exerted by the arms 24 and transferred through the trees to the shoes 58. The tracks 65 provide a predetermined path for the chains in travelling from one sprocket to the other and are, if desired, crowned. Variations in surface roughness of the tree being propelled endwise and/or variations due to crookedness of the tree stem are accommodated to a certain extent by flexing of the individual shoes 58 extending from one chain to the other chain.

Figures 9, 9A:
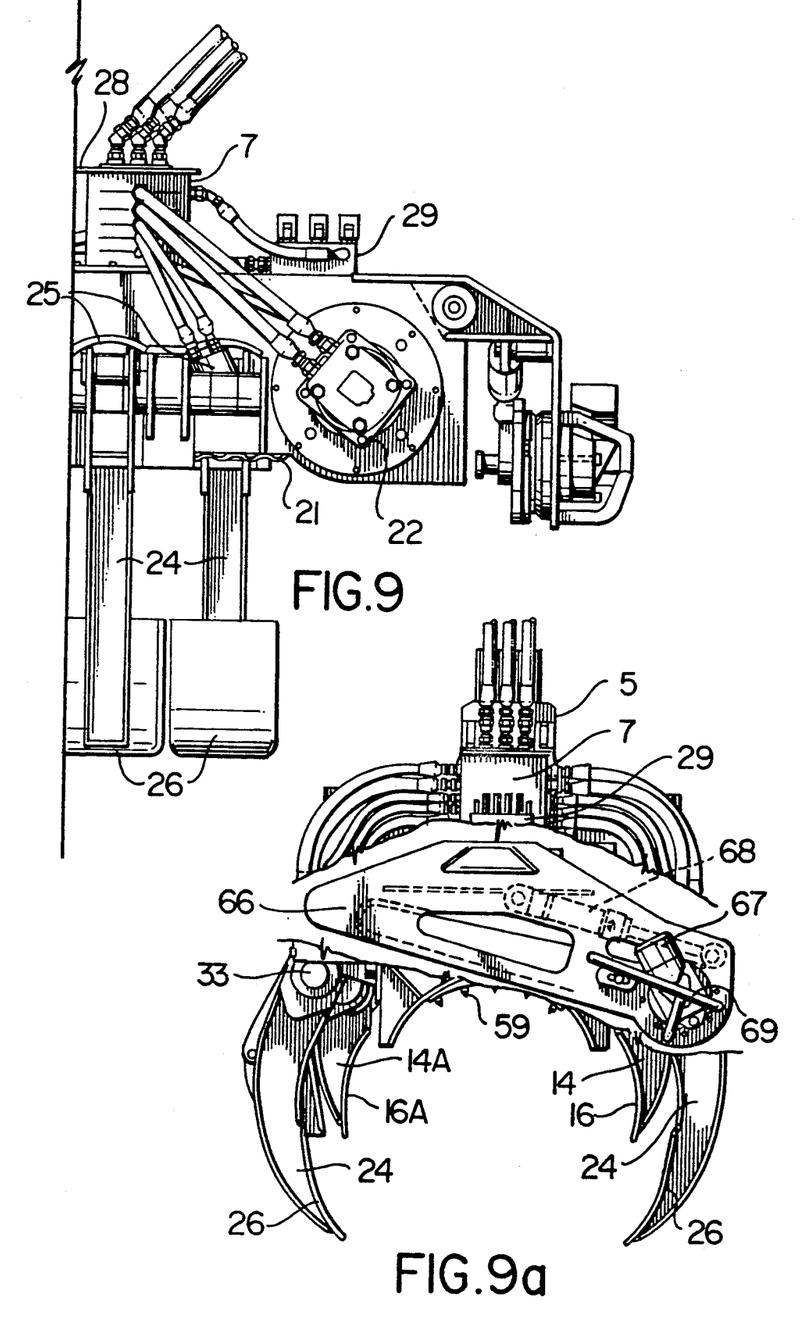
FIGS. 9 and 9a illustrate the inclusion of the chain saw cross-cutting device.

The processing head can be fitted with a cutting device to cut the trees into selected lengths after being delimbed. FIGS. 9 and 9a illustrate the mounting of a conventional chain saw (Hultdins K-55) for this purpose at the trailing end of the processing head. Referring to these drawings, reference 66 designates the chain and saw bar which is driven by a hydraulic motor 67. The saw is pivoted about an axis 69 for cutting with such pivotal movement being controlled by a hydraulic cylinder 68.

The processing head, as illustrated in FIG. 1, is suspended from the free outer end of the knuckle boom by the link mechanism 4. The link mechanism 4 is effectively a universal joint with two spaced apart pivot axes at right angles to one another and in FIG. 1 these are designated respectively 4a and 4b. Conventionally these pivots are nothing more than pin connections allowing free pivotal rotation which has a draw back of allowing the processing head to oscillate wildly during rapid movements of the boom required for operating efficiency in the field. It is desirable to have the processing head stay in the same attitude with respect to a fixed plane regardless of the position of the boom or the direction in which the device may be rotated. For example, in FIG. 1 the longitudinal axis of the processing head will always be horizontal, thus facilitating grappling and deposit of trees.

Figure 11:
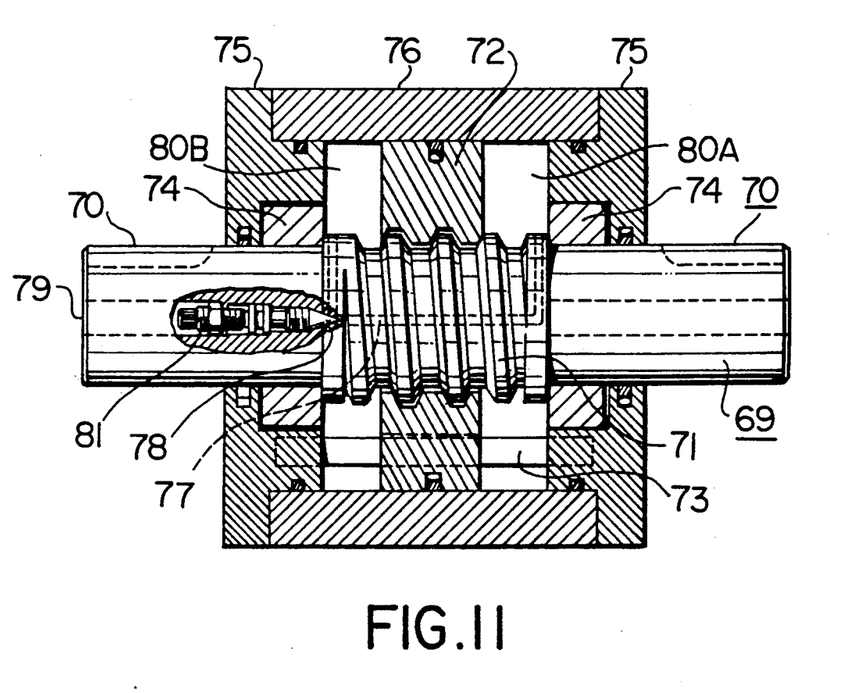
FIG. 11 is a cross-sectional view of a pin type coupling used in the suspension of the processing head from the boom to damp movement of the felling head.

FIG. 11 illustrates a device for damping oscillations and such device may be used at either of the connections 4a or 4b in FIG. 1 or both, depending upon the desired damping effect required. While the motion damper is specifically disclosed herein with reference to a processing head suspended from a boom, it is to be understood such damper is applicable to any work tool suspended from a boom, for example a grapple. This motion damper and refinements thereto are the subject of applicants' aforementioned U.S. application Ser. No. 389,687 filed Aug. 4, 1989.

FIG. 11 illustrates a device for damping the oscillations and it is based on the principle of a helical rotary actuator with the actuation reversed, i.e. instead of the piston driving the shaft, the shaft drives the piston. In addition, instead of an external hydraulic power feed, there is an internal closed loop with the fluid shifting from one side of the piston to the other as the piston is caused to move by the rotating shaft. The flow of fluid from one side to the other is directed through a fixed, or variable orifice as may be desired, which causes a back pressure resisting movement of the piston which in turn resists shaft rotation and thus, the oscillation of the attachment. In a universal joint, one such device on each shaft would be required for full dampening of the motion of the attachment. FIG. 1 illustrates such an arrangement wherein there is a device of the type illustrated in FIG. 11 at each of the designated connections 4a and 4b.

Referring to FIG. 11, shaft 70 is splined or keyed at both ends, which in the case of connection 4a in FIG. 1 is fixed in aperture 30 of the rotator 5 and in the case of connection 4b is fixed to the link 4. Referring to the connection 4a in FIG. 1, with the shaft 70 anchored in aperture 30 of the rotator 5, housing 75 is secured to the link 4. The housing 75 has an internal chamber divided into two parts, designated respectively 80a and 80b by a piston 72. The shaft 70 as a center portion 71, machined with a helical gear of suitable pitch and the piston 72 is machined to fit on the helical section 71. A series of rods 73 extending from one end to the other of the chamber and anchored on the housing pass through the piston allowing the piston to move along the helical section, but prevent it from rotation. The shaft piston assembly is supported by bearings 74 which are capable of carrying both radial and thrust loads. They in turn are carried by bushings forming part of the housing 75. In the embodiment illustrated, the housing 75 is a cylindrical tube 76 with the bearing bushings fitting into opposed ends thereof and detachably secured thereto as by plurality of studs, bolts or the like. Seals are located as required. The housing may be non-circular in cross-section i.e. square with a correspondingly shaped piston. The non-circular configuration prevents rotation of the piston.

Shaft 70 has a fluid flow passage 77 providing communication from one to the other of chambers 80a and 80b. Flow is controlled through the passage by way of example a variable restrictor at juncture 78, the variable restrictor being a needle valve 81 as is well known in the hydraulic art. The needle valve is inserted through a bore 79 in the end of the shaft, the body of the valve being threaded so as to be selectively adjustable. A relief valve, if desired, could be installed in the passage 77 and remote control of the orifice size is also within the knowledge existing in the hydraulic art.

The hydraulic damper of FIG. 11 at position 4a in FIG. 1 dampens oscillations of the processing head, when for example the boom is swinging and suddenly stops. In such instance, the momentum of the felling head causes the shaft 70 to rotate which in turn moves the piston 72 against the fluid in one of the two chambers 80a and 80b, driving the fluid from that one chamber to the other through the restricted opening in the shaft.

A damping device as illustrated in FIG. 11 and located in connection 4b of FIG. 1 restrains oscillation of the processing head during sudden changes from one to the other of extending and retracting the boom. A pair of damping devices of the type illustrated can have their housings rigidly joined together and with the two shafts 70 at right angles to one another. Such unit can have one shaft fixed to the boom and the other shaft fixed to the stator of the rotator. This would replace link 4 in FIG. 1.

The chambers 80a and 80b of the damping device illustrated in FIG. 11 may be filled with a liquid or a grease which essentially are non-compressible. A partially compressible substance may, in some instance, be desirable or in some installations a compressible fluid, such as air, could also be used.

Figure 6:
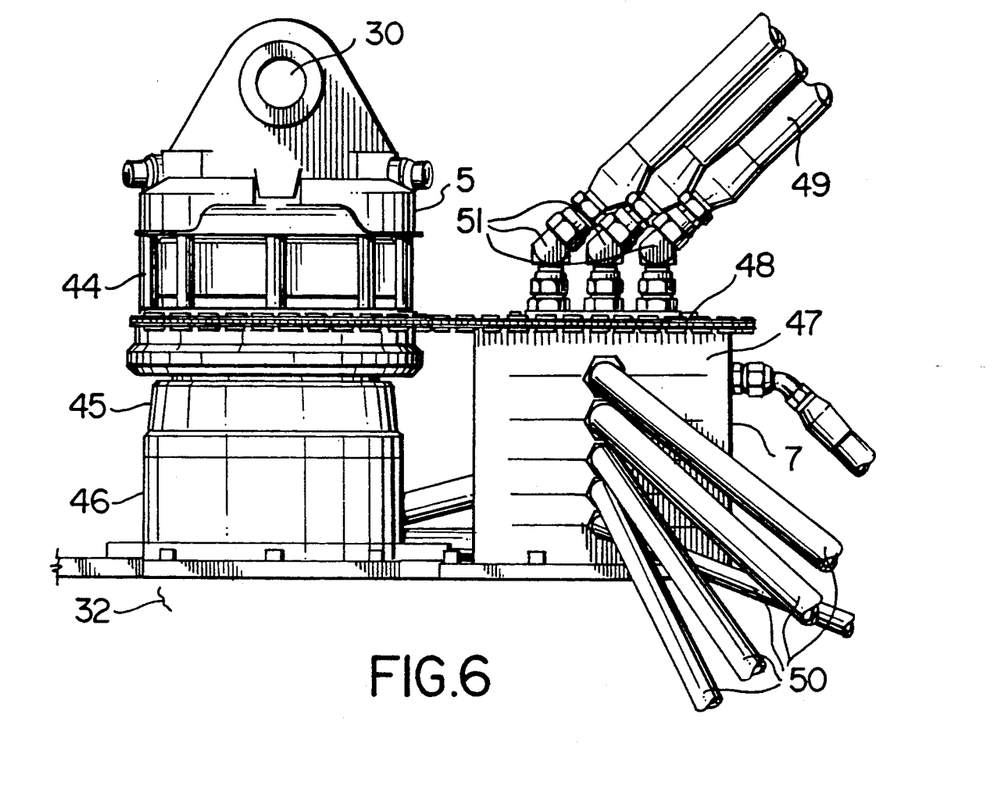
FIG. 6 is a partial side elevational view of a rotary joint arrangement that suspends the processing head from the boom.

Hydraulic power to the processing head is fed through the multi-channel rotary joint 7 (see FIG. 6). The rotating section of the joint 7 is arranged so as to rotate in synchronism with rotation of the rotator 5. In the disclosed embodiment, the rotating section of the joint 7 is mechanically connected to the stator of the rotator 5 by a roller chain 52. The purpose and beneficial effects of this rotary joint are to (a) eliminate extra hose length normally required to prevent excessive hose bending which would be caused by the movement of the fixed ends and rotation, (b) control the motion of the rotary joint rotor so that the hoses are always pointed toward the boom thus minimizing required hose length and (c) improve the appearance of the processing head by bringing order to the hose lines.

FIG. 6 illustrates the relationship between the hydraulically powered rotator 5 and the multiple channel rotary joint 7. The stator of the rotator 5 has an aperture 30 which receives pin designated 4a in FIG. 1 (and 70 in FIG. 11) and the rotor portion 45 of the rotator is secured to the frame 32 of the processing head. Hydraulic lines to power the rotator are located on the boom. The two principle parts of the rotator 5 are the stator 44 and the rotor 45 and since the stator is pinned to the boom, rotor 45 will cause the processing head to rotate movement being through an arc of about 280°. The rotary joint 7 is fixed to the housing 32 of the processing head and therefore moves with the processing head. The rotary joint 7 has an outer tubular housing fixed in relation to the housing 32 of the processing head and rotatably mounted within the tubular housing is a cylindrical core 48. The core 48, through angled fitting 51, receives respective ones of hose lines 49 which constitutes the group of hoses 6 illustrated in FIG. 1. Through appropriate drilling and machining, as is well-known in the art, each line is directed to a circular oil path on the periphery of the core 48 from which the lines 50 are lead to different functions on the processing head. The core 48 can be turned to any position without interrupting the flow.

If the internal friction in the rotary joint is small enough the tug of the hoses, as the processing head is rotated, may be enough to keep the angled fittings 51 pointed at the boom thus eliminating twist in the hoses and permitting minimum hose length as well.

Where rotary joint 7 friction is high, a chain, flexible belt means or other drive means connects the stator 44 of rotator 5 with the core 48 to positively rotate the latter and in unison with rotation of the processing head.

Figure 6A:
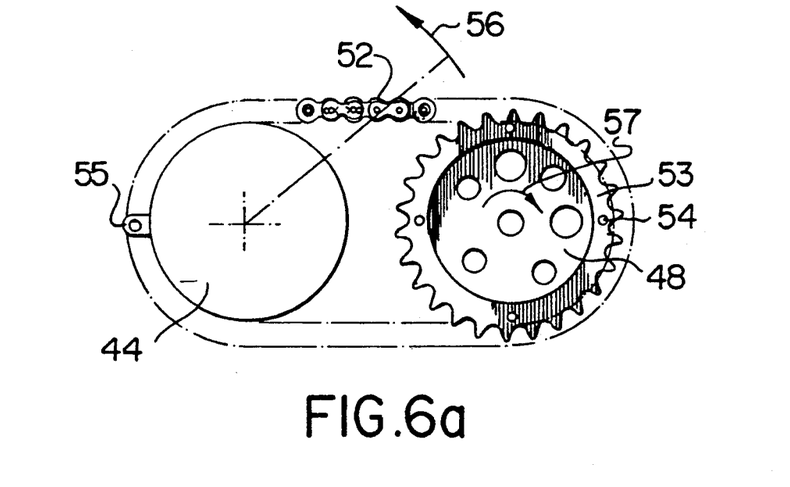
FIG. 6a is a top view schematic of the dynamics of the arrangement of FIG. 6.

FIG. 6a illustrates a sprocket 53 attached to the core 48 by cap screws 54. A link chain 52 encircles the sprocket and the stator 44 of the rotator 5 and it is fixed to the stator at point 55. Thus it can be readily seen that rotating the housing 32 of the processing head in the direction of arrow 56 by rotator 5 will cause the core 48 of rotary joint 7 to counter-rotate in the direction indicated by arrow 57. This keeps the hoses pointing in substantially the same direction, i.e. toward the boom. Varying the diameter of sprocket 53 is a means of varying the rate of rotation of the core 48 with respect to rotor 45 should this be necessary.

Figure 12:
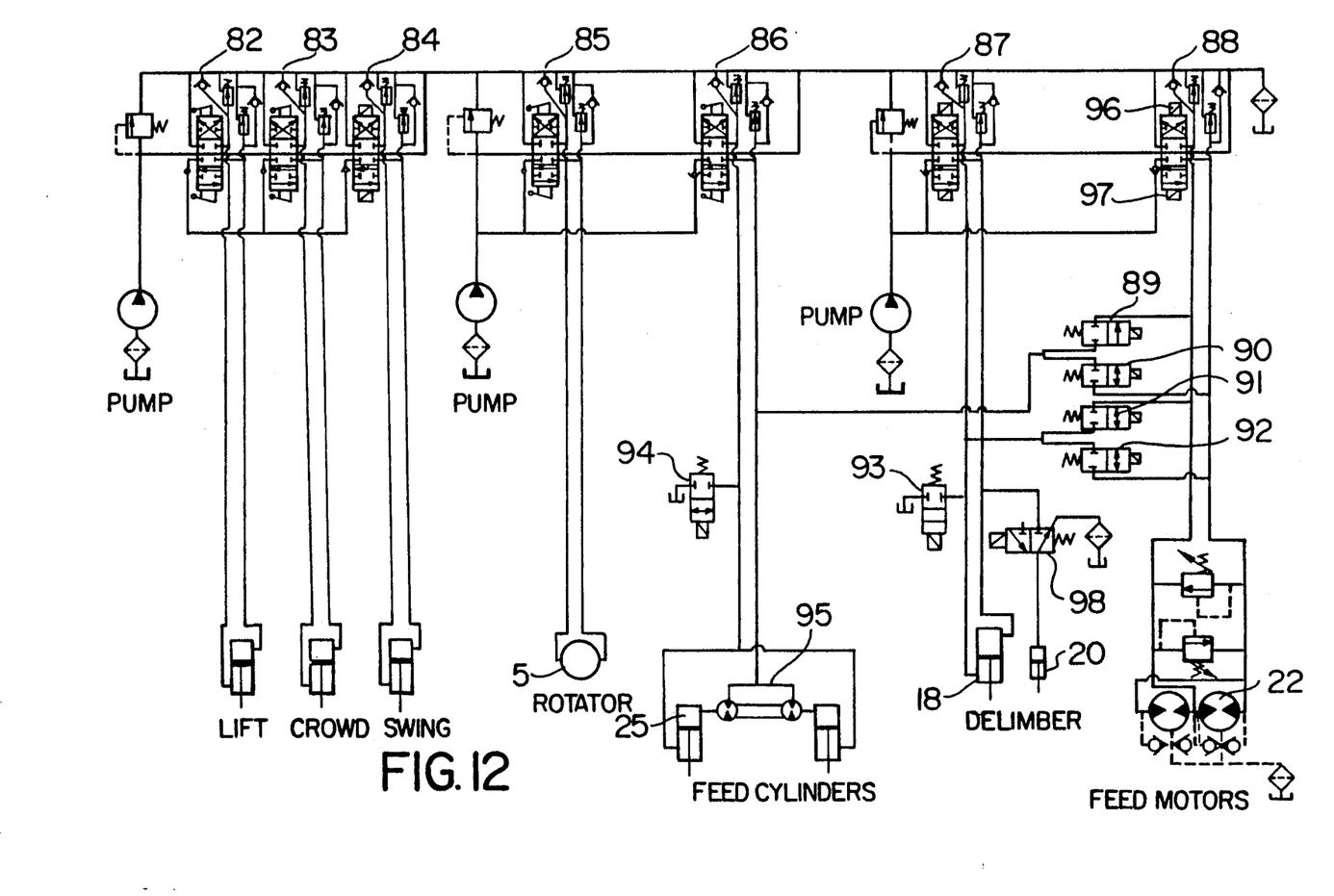
FIG. 12 is a schematic of the hydraulic system for the processing head and boom control of the machine illustrated in FIG. 1.

FIG. 12 is a hydraulic flow diagram for the boom and processing head illustrated in FIG. 1 and in which 82, 83 and 84 designate hydraulic valves to actuate the lift, crowd, and swing functions of the boom 2. Valves 85 and 86 actuate respectively the rotator 5 and hydraulic cylinders 25 of the feed means. Valve 88 actuates the feed motors 22 and valve 87 actuates the delimber arm cylinder 18.

Valves designated 89, 90, 91, 92, 93 and 94 are located in the control block 29 mounted on frame 32 of the processing head. They are all solenoid operated and function to maintain delimber arm and feed arm pressure on the tree during processing. Valves 89 and 92 are wired to actuate together with solenoid 96 and valves 90 and 91 are wired to actuate together with solenoid 97. Valves 93 and 94 open tank lines and are therefore wired to be actuated whenever solenoids 96 or 97 are actuated. The foregoing provides oil from the pressure side of the motors, in forward or reverse rotation, to keep the feed arms 24 pressing the tree against the chain. It also provides oil from the tank side of the motors, in forward or reverse rotation, to keep the delimber arms 14 and 14a pressed against the tree. Reference 98 designates a valve to actuate the hydraulic bolt 20. Reference 95 designates a double motor arrangement on a common shaft for balancing the hydraulic oil flow to the feed arm cylinders 25.

Figure 10:
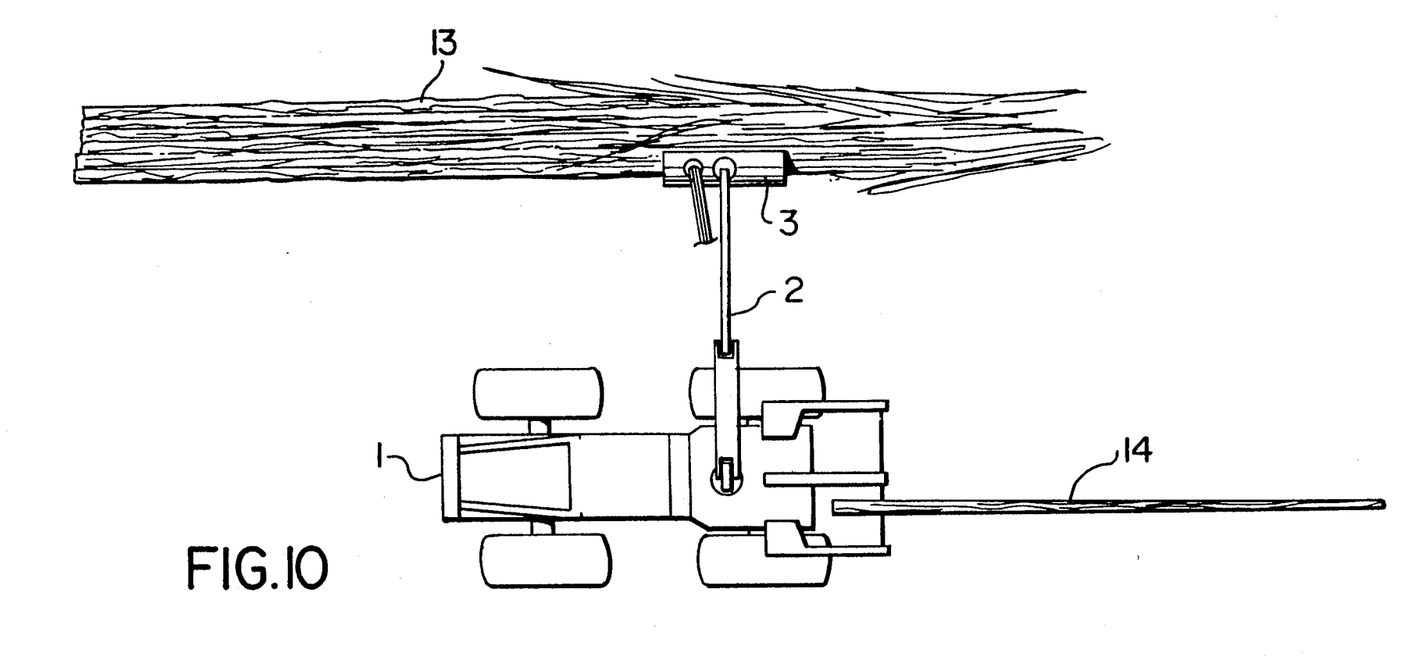
FIG. 10 in top plan view diagrammatically illustrates field operation of the tree processor of the present invention.

FIG. 10 is a schematic of the preferred operating technique. The trees 13 are felled and placed in orderly bunches by a feller-buncher as illustrated. The carrier 1 is positioned adjacent a bunch of trees. The two are shown in generally parallel relationship but some oblique relationship may be preferable depending on terrain and felling and skidding patterns.

The processing head 3 is positioned to grapple a tree with the feed arms 24 at a point between the butt and the top cut-off point and as close to the latter point as is permitted by tree branchiness. The tree is then drawn up to the processing head 3 and there grasped by the delimber 14, 14a thus freeing the grapple arms 24 to grasp a second tree. The delimber arms 14, 14a open to receive the second tree. With two trees encircled by the delimber and pressed by the grapple arms 24 against the feed chain shoes 58, the motors 22 are actuated to move the trees and to bring the top cut-off point into line with the topping knife 19 on the delimber, at the same time delimbing the upper portions of the trees. The hydraulic bolt 20 is activated to release the topping knife 19 for its cutting cycle. The feed is then reversed. As the trees are fed through the processing head they are delimbed. Simultaneously the boom is caused to raise the head, swing, and rotate it so that as the tree butts approach the processing head, the delimbing is complete, the butts are positioned over the bunk, and the stems aligned with the carrier. The trees are then released into the position shown by stem 14 (FIG. 10) and the whole cycle repeated.

As previously mentioned, the point of grappling the second tree, the third tree, the fourth tree and so on can be so chosen if desired that the group of grasp trees to be processed have effectively had any cross-sectional area roughly the same diameter. This ensures positive gripping of the trees with the tree propelling means for processing the trees by moving them endwise through the delimbing shear knives.

When a pile of full trees has been processed and transferred to the carrier, the bunk mechanisms secure the trees and the carrier moves to the next pile to add to its load. When the load is complete, the carrier moves to a truck road or other concentration point, releases the load, and returns to the forest.

In the foregoing, there is disclosed many different aspects to applicant's invention and while they are all disclosed in association with a tree processing head, some are applicable in other technologies. For example, the motion restraining device illustrated in FIG. 11 has numerous other applications, as does also certain features of the conveyor drive means disclosed in FIGS. 8 and 8a. One broad aspect of applicant's invention is the provision of two sets of grapple arms on a frame with one set of arms being longer than the other to accumulate several trees and thereafter process the accumulated trees. Both sets of grapple arms are provided with cutting edges so as to act as a stripper delimber irrespective of direction of travel of the trees being processed.

I claim:

1. A tree processing head adapted to handle more than one tree at a time comprising:
   (a) a frame;
   (b) feed means mounted on said frame for propelling a tree(s) endwise to process the same; and
   (c) two sets of grapple arms on the frame wherein the arms of one set extend to a greater extent from the frame than the other for accumulating trees; said two sets of grapple arms being spaced apart from one another longitudinally along the frame and wherein one of said grapple arm sets act in conjunction with the feed means pressing the tree(s) thereagainst facilitating propelling the same endwise, each of said sets of grapple arms having cutting edges for stripping limbs off tree(s) propelled endwise by the feed means.

2. An improved tree processing head comprising:
   (a) a frame having a fixed delimbing knife edge at each of opposite ends thereof;
   (b) an endless conveyor type feed means mounted on said frame and located between said fixed knives;
   (c) a first set and a second set of grapple arms, pivotally mounted on said frame and located in spaced apart positions relative to one another, longitudinally along the frame; said first pair of grapple arms cooperating with said feed means to press trees there against to increase tractive engagement of the feed means with the tree; said first and second set of grapple arms extending in the same direction from the frame with the arms of the second set extending to a greater extent therefrom than the arms of the first set; said longer arms being capable of grappling trees and feeding them into the bite of the first set of arms which upon closing hold the trees, allowing the second set of arms to gather further trees, each of said sets of grapple arms having cutting edges for stripping limbs from trees as they are propelled endwise by the feed means; and
   (d) hydraulic power means for selectively pivotally moving said arms to accumulate more than one tree for processing of the same at the same time.

3. In a tree processing head of the type having stripper delimber means mounted on a frame and feed means on a frame for propelling trees endwise an improved endless conveyor type feed means comprising two spaced apart endless chains, located respectively on opposite sides and parallel to the feed path and resiliently flexible track shoes extending across the feed path and connected to the endless chains respectively on opposite sides thereof, said shoes being spaced apart from one another longitudinally along the endless chains, said track shoes being of limited flexibility to deflect as a result of severe roughness and/or crookedness of the trees being fed.

4. The improvement as defined in claim 3 wherein a pair of grapple arms are pivotally mounted and associated with the feed means to receive and press one or more trees against the endless track.

5. The improvement as defined in claim 3 wherein said track shoes are concave so as to partially extend around the surface of a tree(s) propelled thereby.

6. The improvement as defined in claim 3 wherein said track shoes are non-metallic.

7. The improvement as defined in claim 6 wherein said non-metallic shoes are nylon.

8. The improvement as defined in claim 3 including a plurality of spikes secured to and projecting from each of said shoes.

9. A method of delimbing and topping prefelled trees comprising:
   (a) positioning a vehicle, fitted with a boom and processing head attached thereto, adjacent a pile of prefelled trees;
   (b) grappling a tree with the processing head at a point between the butt and the top cut-off point of the tree;
   (c) feeding the tree endwise and simultaneously delimbing the tree with the processing head advancing the top cut-off point of the tree toward the processing head;
   (d) stopping the feeding of the tree;

(e) severing the top off the tree above the processed portion thereof;

(f) reversing the feed direction of travel of the tree moving the butt end thereof toward the processing head and simultaneously therewith, or subsequently thereto, raising, swinging and rotating the processing head to position the tree at a selected location; and (g) depositing the processed stem on a carrier or adjacent pile at such selected location.

10. A method of processing more than one tree at a time by a tree processing head having tree accumulating grapple means thereon comprising:

(a) grappling a first tree with said processing head at a position between opposite ends of the tree;

(b) retaining said first tree and grappling a second tree with said processing head;

(c) longitudinally shifting said first and second trees relative to one another until their diameters at substantially any cross-section are substantially the same; and (d) gripping all of the so accumulated trees in the processing head and propelling them endwise as a group by the processing head to remove the limbs from said group of trees.

11. A tree processing head adapted to handle more than one tree at a time comprising:

(a) a frame;

(b) a stripper type delimber mounted on said frame;

(c) feed means mounted on said frame for propelling a tree(s) endwise to strip the limbs therefrom said feed means comprising an endless conveyor and wherein said endless conveyor comprises a pair of endless chains located respectively one on each of opposite sides of the feed path for the objects being propelled endwise and a plurality of individual resiliently flexible shoes interconnecting said pair of chains;

(d) accumulator type grapple means on said frame for accumulating two or more trees to be processed at the same time; and (e) hydraulic power means to operate said delimber, feed means and grapple means.

* * * * *